(12) United States Patent
Zuardy et al.

(10) Patent No.: US 8,859,948 B2
(45) Date of Patent: Oct. 14, 2014

(54) APPARATUS AND METHOD FOR PRODUCING A COMPONENT AND AIRCRAFT STRUCTURE COMPONENT

(75) Inventors: Ichwan Zuardy, Hamburg (DE); Pierre Zahlen, Stade (DE); Clemens Bockenheimer, Bremen (DE); Axel Herrmann, Stade (DE)

(73) Assignee: Airbus Operations GmbH, Hamburg (DE)

( * ) Notice: Subject to any disclaimer, the term of this patent is extended or adjusted under 35 U.S.C. 154(b) by 516 days.

(21) Appl. No.: 13/221,094

(22) Filed: Aug. 30, 2011

(65) Prior Publication Data

US 2012/0217382 A1   Aug. 30, 2012

Related U.S. Application Data

(60) Provisional application No. 61/378,434, filed on Aug. 31, 2010.

(30) Foreign Application Priority Data

Aug. 31, 2010  (DE) .................. 10 2010 035 958

(51) Int. Cl.
| | |
|---|---|
| *G01J 1/04* | (2006.01) |
| *B29C 70/48* | (2006.01) |
| *B29C 70/54* | (2006.01) |
| *B29C 70/08* | (2006.01) |
| *B29C 31/04* | (2006.01) |
| *B29C 44/12* | (2006.01) |
| *B29C 44/60* | (2006.01) |
| *B29C 70/86* | (2006.01) |
| *B64D 45/00* | (2006.01) |
| *B29L 11/00* | (2006.01) |

(52) U.S. Cl.
CPC ............... *B29C 31/04* (2013.01); *Y02T 50/433* (2013.01); *Y02T 50/43* (2013.01); *B29C 70/48* (2013.01); *B29C 70/546* (2013.01); *B29C 70/086* (2013.01); *B29C 44/1285* (2013.01); *B64D 2045/0085* (2013.01); *B29C 44/60* (2013.01); *B29L 2011/00* (2013.01); *B29C 70/865* (2013.01)
USPC ..................................................... 250/227.11

(58) Field of Classification Search
CPC ............ G01J 1/04; B29C 39/44; B29C 37/00
USPC ........ 250/237 G, 227.11–227.19; 385/12, 13, 385/37; 356/32, 35.5
See application file for complete search history.

(56) References Cited

U.S. PATENT DOCUMENTS

| | | | |
|---|---|---|---|
| 6,816,638 B1 * | 11/2004 | Bennion et al. ................. | 385/13 |
| 2004/0130072 A1 | 7/2004 | Sekido et al. | |
| 2009/0278274 A1 | 11/2009 | Bader | |

FOREIGN PATENT DOCUMENTS

| | | |
|---|---|---|
| DE | 102007062111 A1 | 7/2009 |
| WO | 2008/135559 A1 | 11/2008 |

*Primary Examiner* — Seung C Sohn
(74) *Attorney, Agent, or Firm* — Carter DeLuca Farrell & Schmidt LLP

(57) ABSTRACT

An apparatus for producing a component includes a material storage tank for receiving a liquid material (M), a molding tool in which a filling region to be filled with material (M) from the material storage tank is formed, and a material supply line which connects the material storage tank to the filling region of the molding tool. In the region of the material supply line and/or the filling region of the molding tool an optical fiber has been arranged, into which at least one Fibre Bragg Grating sensor for detecting a parameter that is characteristic of the flow of material through the material supply line and/or the filling region of the molding tool is integrated.

15 Claims, 2 Drawing Sheets

APPARATUS AND METHOD FOR PRODUCING A COMPONENT AND AIRCRAFT STRUCTURE COMPONENT

TECHNICAL FIELD

The invention relates to an apparatus and a method for production and quality assurance of a component, in particular a fibre-composite component. The invention further relates to an aircraft structure component, in particular a fibre-reinforced aircraft structure component, that is suitable for use as a load-bearing component in an aircraft.

BACKGROUND

Efforts are being made in aircraft construction to employ components on an increasing scale that consist completely or partly of fibre-reinforced composite materials, for example carbon-fibre-reinforced plastics (CFRP), as load-bearing components. For example, DE 10 2007 062 111 A1 describes a transverse-member structure consisting of carbon-fibre-reinforced plastic, which serves for supporting the individual panels of an aircraft-floor system for separating a passenger cabin from a cargo compartment arranged below the passenger cabin. Furthermore, it is likewise known from DE 10 2007 062 111 A1, for example, to employ components realised in a sandwich construction, with a core and also with top layers, applied onto the core, consisting of a fibre-reinforced plastic material, as floor panels or ceiling panels in an aircraft.

For the purpose of producing components from fibre-reinforced composite materials, as a rule the reinforcing fibres are firstly introduced into a moulding tool. Subsequently the fibres are impregnated with the matrix material which is usually present in liquid form. Finally, curing of the matrix material is effected by appropriate control of temperature and/or pressure. Known methods for producing components from fibre-reinforced composite materials include injection methods, wherein the liquid matrix material is injected into a closed moulding tool under elevated pressure of over 6 bar. Furthermore, infusion methods are known, wherein the reinforcing fibres are inserted into an open moulding tool and are covered with a semipermeable membrane that is pervious to gases but impervious to the matrix material. The semipermeable membrane is covered by a gas-impervious film, so that an underpressure can be applied between the semipermeable membrane and the gas-impervious film and, as a result, liquid matrix material can be sucked into the moulding tool.

Irrespective of whether an injection method or an infusion method is employed for producing a component from a fibre-reinforced composite material, the control of the flow of matrix material into and through the moulding tool is of crucial importance for the quality of the component. Therefore in the case of production of the component by an infusion method with an open moulding tool the flow of matrix material is ordinarily monitored by means of a CCD camera. In the case of production of the component by an injection method with a closed moulding tool, on the other hand, visual monitoring of the flow of matrix material is not possible, so that sensors such as, for example, ultrasonic sensors, line sensors operating capacitively, temperature sensors or pressure sensors come into operation here. As a rule, however, sensor-based measuring principles of such a type are not capable of being employed in real time, by reason of the fact that the sensors can only detect changes in the corresponding physical measured quantities associated with the actual advance of the front of matrix material.

SUMMARY

The invention is directed towards the object of specifying an apparatus and a process for producing a component that enable an easy and reliable monitoring of a flow of material into and through a moulding tool. Furthermore, the invention is directed towards the object of making available a structural component for an aircraft, in particular a fibre-reinforced structural component for an aircraft, that suitable for use as a load-bearing component in an aircraft.

This object is achieved by an apparatus with the features of claim 1, a method with the features of claim 6, and by an aircraft structure component with the features of claim 13.

The apparatus according to the invention for producing a component includes a material storage tank for receiving a liquid material. The material received in the material storage tank is preferentially a material, for example a plastic material, that is suitable as matrix material of a fibrous composite material. For example, the material received in the material storage tank may be a curable resin, in particular an epoxy resin or an epoxy-amine resin. For example, the material storage tank may be filled with an RTM6 resin manufactured by Hexcel. The apparatus according to the invention further includes a moulding tool in which a filling region to be filled with material from the material storage tank is formed. Furthermore, a material supply line is present which connects the material storage tank to the filling region of the moulding tool.

Merely one uninterrupted filling region to be filled with material from the material storage tank may is formed in the moulding tool. Alternatively, however, the moulding tool may also exhibit several filling regions, separated from one another, to be filled with material from the material storage tank. With such a configuration of the moulding tool, preferentially several material supply lines are also present which connect the individual filling regions, separated from one another, of the moulding tool to the material storage tank. Furthermore, an uninterrupted filling region may, of course, also be connected to the material storage tank via several material supply lines, for example if it is desired to fill the filling region formed in the moulding tool as quickly as possible, via various material inlets or from various directions, with material from the material storage tank.

In the course of producing a component by means of the apparatus according to the invention the liquid material is conveyed out of the material storage tank through the material supply line into the moulding tool and finally through the filling region of the moulding tool, preferentially until the filling region of the moulding tool is completely filled with the material from the material storage tank. For the purpose of conveying the material out of the material storage tank into the filling region of the moulding tool, a suitable conveying device, for example a pump, may be present. The pump may be provided to subject the liquid material in the material storage tank to an elevated pressure of, for example, over 6 bar. Alternatively, however, the conveying device may also be adapted to generate an underpressure in the filling region of the moulding tool and thereby to suck material out of the material storage tank into the filling region of the moulding tool.

The apparatus according to the invention can be employed for the purpose of producing a component consisting merely of the material from the material storage tank. In particular, the apparatus according to the invention may, however, come into operation for the purpose of producing a component that consists, at least in sections, of a fibre-reinforced composite material. Production of a component consisting, at least in sections, of a fibre-reinforced composite material by means of the apparatus according to the invention may be undertaken by an injection method or by an infusion method. Furthermore, according to demand, use may be made of an open or a closed moulding tool. Irrespective of the configuration of the conveying device and of the moulding tool, however, a movement of a front of the material through the material supply line and subsequently through the filling region formed in the moulding tool always occurs.

If the liquid material received in the material storage tank, as mentioned above, is to find application as matrix material of a fibre-reinforced composite material, prior to the supply of the material from the material storage tank a fibrous material can be introduced into the moulding tool, i.e. into the filling region formed in the moulding tool. The reinforcing fibres can be introduced into the filling region of the moulding tool in the form of individual fibres designed as short fibres or continuous fibres, as a fibrous wad or in the form of a two-dimensional or three-dimensional fibrous fabric. The introduction of reinforcing fibres into the filling region of the moulding tool, however, does not alter the fact that in the course of the supply of the liquid material from the material storage tank into the filling region of the moulding tool a front of the liquid material moves firstly through the material supply line and subsequently through the filling region of the moulding tool.

The flow of the material out of the material storage tank through the material supply line and/or the filling region of the moulding tool constitutes an important process parameter in the course of producing a component by means of the apparatus according to the invention. The rate of motion of a flow front of the material out of the material storage tank through the material supply line and/or the filling region of the moulding tool depends, inter alia, on the temperature, on the (temperature-dependent) viscosity of the material and on the conveying capacity of a conveying device for conveying the material out of the material storage tank through the material supply line and/or the filling region of the moulding tool. Therefore the apparatus according to the invention includes at least one optical fibre arranged in the region of the material supply line and/or the filling region of the moulding tool. Integrated into this optical fibre is at least one Fibre Bragg Grating sensor for detecting a parameter that is characteristic of the flow of material through the material supply line and/or the filling region of the moulding tool. The Fibre Bragg Grating sensor is constituted by a section of the optical fibre in which the refractive index of a fibre core varies periodically, so that, depending on the period, light of a certain wavelength is reflected by the Bragg grating structure. In particular, the light reflection of the Bragg grating structure obeys the condition $$\lambda_B = [(n_1 + n_2)/2] \cdot 2\Lambda$$

where $\lambda_B$ is the wavelength of the light reflected from the Bragg-grating structure, $n_1$ and $n_2$ are the periodically varying refractive indices of the fibre core, and $\Lambda$ is the period of the refractive-index variation.

A deformation of the optical fibre in the longitudinal direction of the fibre, which may be caused by a mechanical elongation or compression of the fibre, but also by a change in temperature in the environment of the fibre, results in an alteration of the period $\Lambda$ of the Bragg grating and consequently in an alteration of the wavelength $\lambda_B$ of the light reflected from the Bragg-grating structure. A registration of the wavelength $\lambda_B$ of the light reflected from the Bragg-grating structure of the Fibre Bragg Grating sensor consequently enables a very accurate detection of a deformation of the optical fibre in the longitudinal direction of the fibre. If a mechanical deformation of the optical fibre is excluded, that is to say, if the deformation of the fibre is exclusively temperature-induced and consequently capable of being described by the coefficient of thermal expansion of the fibre, the evaluation of the wavelengths $\lambda_B$ of the light reflected from the Bragg grating structure of the Fibre Bragg Grating sensor consequently immediately enables conclusions as regards changes of temperature in the environment of the optical fibre.

The Fibre Bragg Grating sensor can consequently be used in the apparatus according to the invention for producing a component for the purpose of detecting deformations of the optical fibre in the longitudinal direction of the fibre that are caused by changes of temperature in the environment of the optical fibre. These changes of temperature are, in turn, caused by the flow of the material out of the material storage tank through the material supply line and/or through the filling region of the moulding tool. In other words, the Fibre Bragg Grating sensor detects a deformation of the optical fibre in the longitudinal direction of the fibre, which is caused by a change of temperature in the environment of the optical fibre as a parameter characteristic of the flow of material through the material supply line and/or through the filling region of the moulding tool.

The Fibre Bragg Grating sensor employed in the apparatus according to the invention is fundamentally capable of detecting even small changes of temperature in the environment of the optical fibre very accurately. A particularly high measurement accuracy, however, is obtained when the material in the material storage tank has a temperature differing from that of the moulding tool. For example, the material in the material storage tank may be heated up to a temperature of about 80° C., whereas the material supply line and/or the moulding tool is/are heated up to a temperature of about 120° C. It will be understood that the movement of a front of the material out of the material storage tank through the material supply line and/or the filling region of the moulding tool then has the consequence of an immediate change of temperature in the environment of the optical fibre arranged in the region of the material supply line and/or the filling region of the moulding tool. In particular, the change of temperature in the environment of the optical fibre can be detected even before the front of the material has actually passed the Fibre Bragg Grating sensor. By means of the Fibre Bragg Grating sensor the progress of the front of the material through the material supply line and/or the filling region of the moulding tool can consequently be detected in real time. The range of temperature that is capable of being detected by means of a Fibre Bragg Grating sensor preferentially lies between −270° C. and 200° C.; the measurement accuracy preferentially amounts to $\Delta T \leq 0.5$ K and the reproducibility of the measurements is around 0.1 K.

The apparatus according to the invention for producing a component consequently enables an easy and reliable monitoring of the flow of material out of the material storage tank through the material supply line and/or the filling region of the moulding tool. According to demand, merely the flow of material through the material supply line or the filling region of the moulding tool can be monitored by means of a Fibre Bragg Grating sensor. Preferentially, however, both the flow of material through the material supply line and the flow of material through the filling region of the moulding tool are monitored. A further advantage of the Fibre Bragg Grating sensor employed in the apparatus according to the invention for producing a component consists in the small physical size of the optical fibre receiving the Fibre Bragg Grating sensor.

In principle, merely a single optical fibre with an integrated Fibre Bragg Grating sensor or with a plurality of integrated Fibre Bragg Grating sensors may be employed in order to monitor the flow of material through the material supply line and/or the filling region of the moulding tool. If desired or if required for reasons of measurement accuracy, bundles of optical fibres with integrated Fibre Bragg Grating sensors may, of course, also be employed, which may be arranged along the material supply line or integrated into the moulding tool.

The parameter detected by the Fibre Bragg Grating sensor, which is characteristic of the flow of material through the material supply line and/or the filling region of the moulding tool, may be evaluated by means of a suitable evaluating unit and, if desired, monitored manually. For example, the evaluating unit may include a light-source for coupling light into the optical fibre, as well as a spectrometer for detecting the wavelength of the light reflected from the Bragg Grating structure of the Fibre Bragg Grating sensor. From the wavelength of the light reflected from the Bragg-grating structure of the Fibre Bragg Grating sensor the evaluating unit can then determine the change of temperature to be measured in the environment of the optical fibre. The apparatus according to the invention, however, preferentially includes a control unit integrated into the evaluating unit or formed separately, which, for example, is realised in the form of an electronic control unit and may be adapted to control the flow of material through the material supply line and/or the filling region of the moulding tool automatically in dependence on the signals output by the Fibre Bragg Grating sensor or the evaluating unit. For example, the control unit may be adapted to receive the signals output by the Fibre Bragg Grating sensor or by the evaluating unit and to control a heating device for heating the material storage tank, a heating device for heating the moulding tool, and/or a conveying device for conveying the material out of the material storage tank through the material supply line and/or the filling region of the moulding tool in dependence on the signals output by the Fibre Bragg Grating sensor or. By appropriately controlling a heating device for heating the material storage tank and/or a heating device for heating the moulding tool, the viscosity of the material flowing through the material supply line and/or the filling region of the moulding tool and consequently the rate of flow of the material through the material supply line and/or the filling region of the moulding tool can be influenced. In similar manner, by appropriately controlling a conveying device the flow-rate of the material through the material supply line and/or the filling region of the moulding tool can be influenced. The control unit consequently makes it possible to react immediately to the results of measurement provided by the Fibre Bragg Grating sensor. For example, the control unit can compare the measured values provided by the Fibre Bragg Grating sensor with corresponding set values, and on the basis of a measured-value/set-value comparison of such a type can bring influence to bear on the flow of material though the material supply line and/or the filling region of the moulding tool.

In the apparatus according to the invention for producing a component, an optical fibre or an optical fibre bundle may extend along at least one section of the material supply line. For example, the material supply line may be wrapped around by an optical fibre bundle. A plurality of Fibre Bragg Grating sensors for detecting a parameter that is characteristic of the flow of material through the material supply line may be integrated into the optical fibre or into the optical fibre bundle. The Fibre Bragg Grating sensors are preferentially arranged in distributed manner along the material supply line, so that an advance of the front of the material through the material supply line can be registered more or less continuously.

Alternatively or additionally, an optical fibre or an optical fibre bundle may extend along at least one section of the filling region of the moulding tool. Particularly when the filling region of the moulding tool or a filling-region section is of planar design, a planar arrangement of an optical fibre bundle in the region of the planar filling region or filling-region section also presents itself, since this enables a surface-covering detection of the progress of the material through the filling region. In turn, a plurality of Fibre Bragg Grating sensors for detecting a parameter that is characteristic of the flow of material through the filling region may be integrated into the optical fibre or into the optical fibre bundle. The Fibre Bragg Grating sensors are preferentially arranged in distributed manner along the filling region, so that, once again, an almost continuous and preferentially surface-covering detection of the progress of the front of the material through the filling region of the moulding tool becomes possible.

An optical fibre arranged in the region of the filling region of the moulding tool or an optical fibre bundle arranged in the region of the filling region of the moulding tool may be separated from the filling region by a separating device. The separating device may, for example, be designed in the form of a semipermeable membrane that is pervious to gases but impermeable to the material from the material storage tank, or in the form of another film, for example a gas-impervious film. If the optical fibre or the optical fibre bundle is separated from the filling region by a separating device, this avoids the optical fibre or the optical fibre bundle being contaminated by the liquid material to be introduced into the filling region of the moulding tool. The optical fibre or the optical fibre bundle can then be re-used particularly easily and conveniently, that is to say, it may come into operation in the course of producing several components.

Alternatively or additionally, however, an optical fibre or an optical fibre bundle may also be arranged directly in the filling region of the moulding tool. With such a configuration of the apparatus according to the invention for producing a component, the optical fibre or the optical fibre bundle is directly flowed around by the liquid material in the course of the supply of material from the material storage tank into the filling region of the moulding tool. This enables the realisation of a particularly high measurement accuracy, wherein by reason of the small physical size of the optical fibre the flow of material through the material supply line and/or the filling region is not significantly influenced or even impaired. If the optical fibre or the optical fibre bundle is to be re-used and if the material supplied into the filling region of the moulding tool is a curable material, after the supply of the material into the filling region of the moulding tool it is, however, necessary to remove the optical fibre or the optical fibre bundle from the filling region of the moulding tool before the liquid material supplied into the filling region of the moulding tool is cured. Furthermore, the optical fibre or the optical fibre bundle has to be cleaned after removal from the filling region of the moulding tool.

In a preferred embodiment of the apparatus according to the invention for producing a component a receiving region for receiving a core of a sandwich component is formed in the moulding tool. The filling region of the moulding tool may extend along a surface of this receiving region. As a result, a core of a sandwich component introduced into the moulding tool can be provided with a surface layer that includes the material from the material storage tank. If desired, the moulding tool may be configured in such a way that a core of a sandwich component received in the moulding tool can be provided in the region of two opposing surfaces with a surface layer that includes the material from the material storage tank. For this purpose the moulding tool may be provided with an uninterrupted filling region which extends along the opposing surfaces of the receiving region of the moulding tool which is provided for receiving the core of the sandwich component. Alternatively, however, the moulding tool may also be provided with two filling regions separated from one another, which each extend along a surface of the receiving region and are connected to the material storage tank via a separate material supply line. A filling region or filling-region section that is suitable for forming a surface layer on a core of a sandwich component received in the moulding tool is preferentially monitored by means of an optical fibre bundle arranged in planar manner, which enables a surface-covering detection of the progress of material through the filling region or the filling-region section.

Furthermore, the filling region of the moulding tool may extend through the receiving region of the moulding tool which is provided for receiving a core of a sandwich component. With such a configuration of the moulding tool, regions integrated into the core of a sandwich component, in particular reinforcing regions, can be manufactured that include the material from the material storage tank. It will be understood that in the region of a filling region that, for the purpose of producing a reinforcing region integrated into the core of a sandwich component, extends through a receiving region formed in the moulding tool an optical fibre may also be arranged, into which a Fibre Bragg Grating sensor or a plurality of Fibre Bragg Grating sensors for detecting a parameter that is characteristic of the flow of material through the filling region has/have been integrated. The flow of material through the filling-region section extending through a receiving region formed in the moulding tool may take place substantially perpendicular to the flow of material through a filling-region section that is suitable for forming a surface layer on a core of a sandwich component received in the moulding tool.

A method according to the invention for producing a component includes the supplying of material from a material storage tank into a filling region of a moulding tool to be filled with the material from the material storage tank via a material supply line. If the method according to the invention is to be employed for the purpose of producing a component that is fibre-reinforced at least in sections, prior to the supply of material from the material storage tank into the filling region of the moulding tool a fibrous material can be introduced into the filling region of the moulding tool. Furthermore, the production method according to the invention includes the detecting of a parameter that is characteristic of the flow of material through the material supply line and/or the filling region of the moulding tool by means of a Fibre Bragg Grating sensor which is integrated into an optical fibre arranged in the region of the material supply line and/or the filling region of the moulding tool.

The flow of material through the material supply line and/or the filling region of the moulding tool can be controlled by a control unit in dependence on the signals output by the Fibre Bragg Grating sensor.

A parameter that is characteristic of the flow of material through the material supply line can be detected by means of a plurality of Fibre Bragg Grating sensors that are integrated into an optical fibre extending along at least one section of the material supply line and in particular that are arranged in distributed manner along the material supply line. Additionally or alternatively, a parameter that is characteristic of the flow of material through the filling region of the moulding tool can be detected by means of a plurality of Fibre Bragg Grating sensors that are integrated into an optical fibre extending along at least one section of the filling region and in particular that are arranged in distributed manner along the filling region.

An optical fibre arranged in the region of the filling region of the moulding tool may be separated from the filling region by a separating device. Additionally or alternatively, an optical fibre arranged in the region of the filling region of the moulding tool may be arranged directly in the filling region.

After completion of the supply of material from the material storage tank into the filling region an optical fibre arranged in the region of the filling region of the moulding tool may be removed from the moulding tool before the material supplied into the filling region is cured. This applies both to optical fibres that are separated from the filling region by a separating device and to optical fibres that are arranged directly in the filling region.

Alternatively, however, after completion of the supply of material from the material storage tank into the filling region it is also conceivable to leave in the moulding tool an optical fibre arranged directly in the filling region of the moulding tool while the material supplied into the filling region is being cured. As a result, a component with an optical fibre integrated into the component, that is to say, a component with a Fibre Bragg Grating sensor integrated into the component, can be produced.

If the process according to the invention is to be employed for the purpose of producing a sandwich component, a core of the sandwich component can be introduced into a receiving region formed in the moulding tool. The material from the material storage tank can be supplied into a filling region of the moulding tool which extends along a surface of this receiving region. As a result, the core of the sandwich component can be provided with a surface layer that includes the material from the material storage tank. Additionally or alternatively, the material from the material storage tank can also be supplied into a filling region of the moulding tool which extends through the receiving region into which the core of the sandwich component is introduced. As a result, the core of the sandwich component is provided with regions integrated into the core that contain the material from the material storage tank.

An aircraft structure component according to the invention includes at least one optical fibre into which at least one Fibre Bragg Grating sensor for detecting a parameter that is characteristic of the structural integrity of the structural component for an aircraft is integrated. By way of parameter that is characteristic of the structural integrity of the aircraft structure component, the Fibre Bragg Grating sensor preferentially detects, as elucidated above, a deformation of the optical fibre in the longitudinal direction of the fibre, from which conclusions as regards a mechanical or temperature-induced deformation of the component are possible. A component of such a type can be employed advantageously in particular when the structural integrity of the component is particularly important. The aircraft structure component according to the invention is consequently also suitable as a safety-relevant component in aircraft construction.

The optical fibre is preferentially integrated into a section of the aircraft structure component consisting of a fibre-reinforced composite material. For example, the optical fibre may be integrated into a section of an aircraft structure component realised in a sandwich construction, consisting of a fibre-reinforced composite material.

BRIEF DESCRIPTION OF THE DRAWINGS

A preferred embodiment of the invention will now be elucidated in more detail on the basis of the appended schematic drawings, in which.

DETAILED DESCRIPTION

Figure 1:
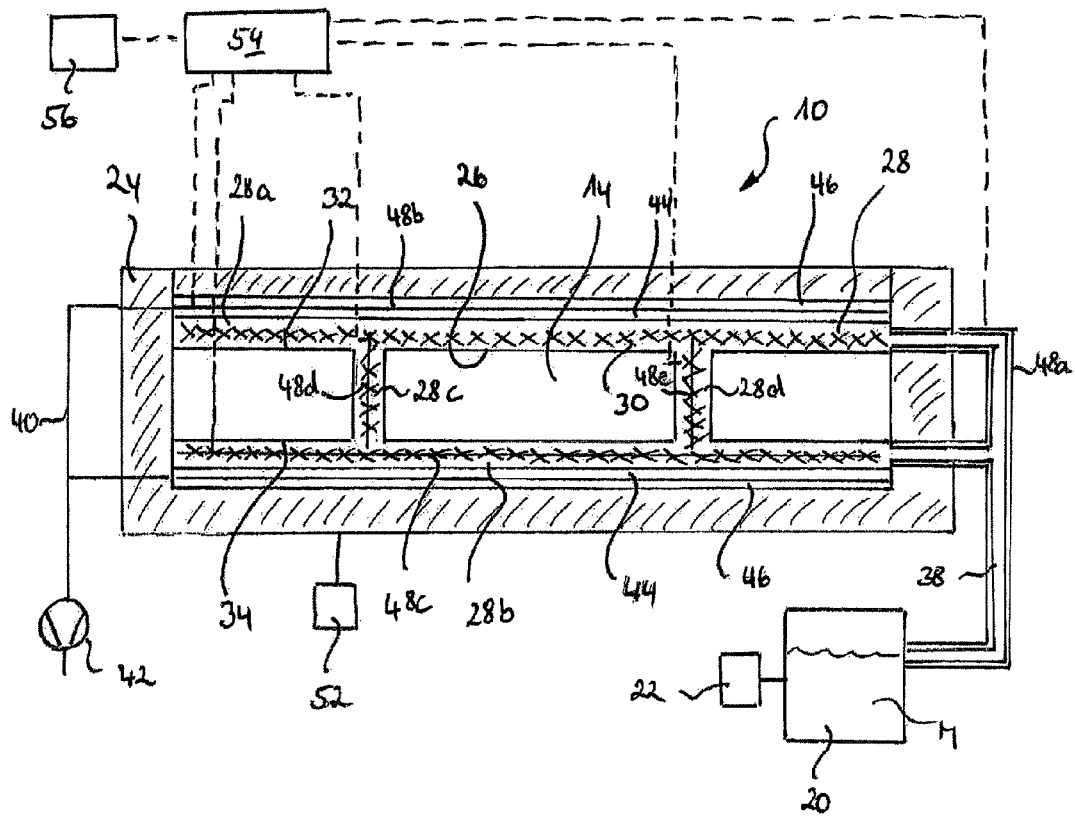
FIG. 1 shows an apparatus for producing a component.
Figure 3:
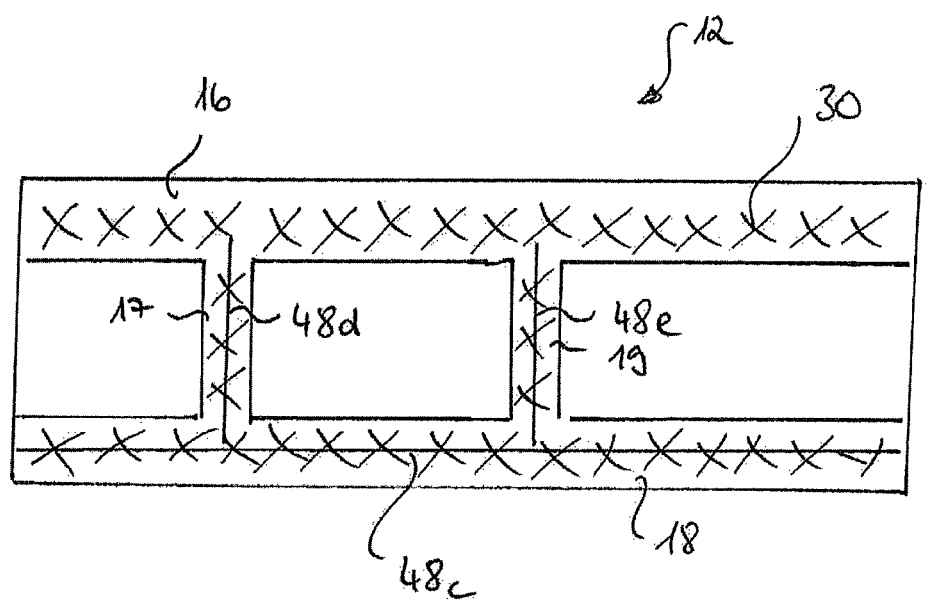
FIG. 3 shows an aircraft structure component that has been produced by means of an apparatus according to FIG. 1.

FIG. 1 shows an apparatus 10 for producing a component 12 illustrated in FIG. 3. In the embodiment described here, the component 12 has been provided for use as a structural component for an aircraft, realised in a sandwich construction, and includes a core 14 consisting of a foam material and also superficial top layers 16, 18 consisting of a fibre-reinforced composite material. Furthermore, reinforcing region 17, 19 consisting of a fibre-reinforced composite material are integrated into the core 14 of the component. The apparatus 10 may, however, also come into operation for the purpose of producing a differently constructed component. For example, the apparatus 10 may be used for producing a component that is constructed merely in one phase and, for example, that consists of a curable plastic material.

The apparatus 10 includes a material storage tank 20 in which a liquid material M is received. For example, the material storage tank 20 may be filled with a curable resin such as, for example, an epoxy resin or an epoxy-amine resin. The material M received in the material storage tank 20 is in the liquid state. By means of a first heating appliance 22 the material storage tank 20 or the material M received in the material storage tank 20 can be heated up to a desired material. In the case of the processing of epoxy resin or epoxy-amine resin, the material storage tank can be heated up by means of the first heating appliance 22, for example to a temperature of about 80° C.

Furthermore, the apparatus 10 includes a moulding tool 24. In the moulding tool 24 a receiving region 26 for receiving the core 14 of the component 12 realised in a sandwich construction is formed. Furthermore, the moulding tool 24 includes a filling region 28 into which a reinforcing material 30 designed in the form of a fibrous fabric is introduced. By way of reinforcing material 30, arbitrary fibres that are suitable for producing fibre-reinforced composite materials may come into operation. Preferentially, however, the reinforcing material 30 consists of carbon fibres. The core 14 inserted into the receiving region 26 of the moulding tool 24 consists, for example, of a closed-cell polymethacrylimide foam.

The filling region 28 formed in the moulding tool 24 includes two sections 28a, 28b which extend in planar manner along two opposing surfaces 32, 34 of the receiving region 26. By supply of material M from the material storage tank 20 into filling-region sections 28a, 28b, the superficial top layers 16, 18 of the component 12 covering the sandwich-component core 14 along two opposing surfaces can consequently be generated from a fibre-reinforced composite material, for example from a carbon-fibre-reinforced plastic material. Furthermore, the filling region 28 exhibits two sections 28c, 28d which extend through the receiving region 26 and consequently through the core 14 of the sandwich component 12 received in the receiving region 26. A reinforcing material 30 designed in the form, for example, of carbon fibres is introduced into sections 28c, 28d of the filling region 28, so that by virtue of the supply of material M from the material storage tank 20 into filling-region sections 28c, 28d the reinforcing regions 17, 19 integrated into the core 14 of the sandwich component 12 can be generated from carbon-fibre-reinforced plastic.

The filling region 28 of the moulding tool 24 is connected to the material storage tank 20 via a material supply line 38. Furthermore, the filling region 28 formed in the moulding tool 24 is connected via a line 40 to a conveying device 42 designed in the form of a pump. In the embodiment of the apparatus 10 illustrated in FIG. 1 the conveying device 42 serves to generate an underpressure in the filling region 28 of the moulding tool 24 and thereby to convey material M out of the material storage tank 20 into the filling region 28 of the moulding tool 24. With a configuration of such a type, the material storage tank 20 does not have to be subjected to elevated pressure. Alternatively, however, an arrangement is also conceivable in which, by virtue of the generation of an elevated pressure in the material storage tank 20 of, for example, up to 6 bar, the material M from the material storage tank 20 is conveyed out of the material storage tank 20 into the material supply line 38 and finally into the filling region 28 of the moulding tool 24.

In the region of their surfaces facing away from the receiving region 26 filling-region sections 28a, 28b of the moulding tool 24 are delimited by a semipermeable membrane 44 that is pervious to gases but impervious to the material M from the material storage tank 20. The semipermeable membrane 44 is, in turn, covered with a gas-pervious film 46. The line 40 connected to the conveying device 42 is linked to the interspace formed between the semipermeable membrane 44 and the film 46. A configuration of such a type makes it possible to generate in the filling region 28 of the moulding tool 24 the underpressure required for conveying the material M out of the material storage tank 20 into the filling region 28, and at the same time to prevent material M from the material storage tank 20 from being sucked out of the filling region 28 into the line 40.

Figure 2:
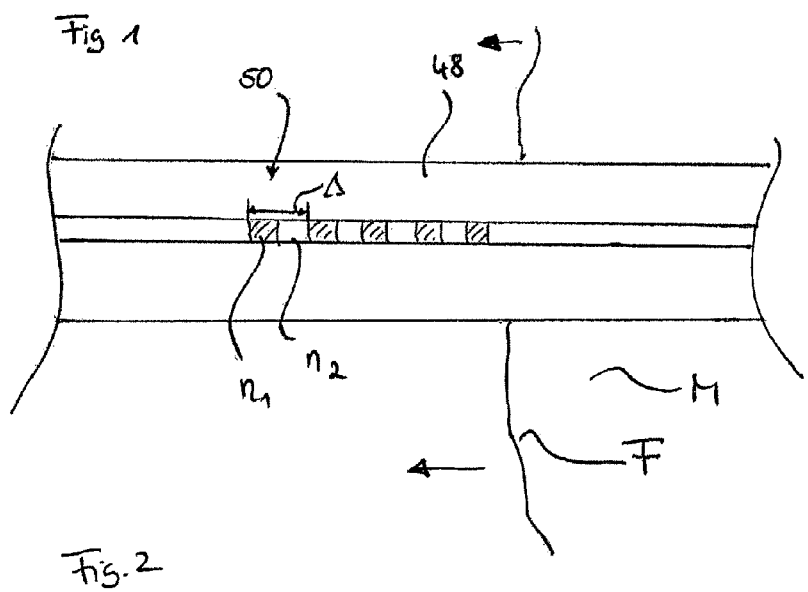
FIG. 2 shows an optical fibre employed in the apparatus according to FIG. 1 with an integrated Fibre Bragg Grating sensor.

The material supply line 38 connecting the material storage tank 20 to the filling region 28 of the moulding tool 24 is wrapped around with a first optical fibre bundle 48a. An individual fibre 48 of an optical fibre bundle of such a type is illustrated in detail in FIG. 2. A plurality of Fibre Bragg Grating sensors 50 which are arranged in distributed manner along the material supply line 38 are integrated into the individual fibres 48 of the first optical fibre bundle 48a. Each of the fibre Bragg-grating sensors 50 is constituted by a section of the optical fibre 48 in which the refractive index $n_1$, $n_2$ of a fibre core varies periodically, so that light of a certain wavelength $\lambda_B$ is reflected by the Bragg Grating structure in dependence on the period $\Lambda$.

A second optical fibre bundle 48b is arranged in the region of filling-region section 28a, the second optical fibre bundle 48b extending two-dimensionally, i.e. in planar manner, along filling-region section 28a. A plurality of Fibre Bragg Grating sensors 50 which are arranged in planar distributed manner along filling-region section 28a are also integrated into the second optical fibre bundle 48b. In similar manner, a third optical fibre bundle 48c is positioned in planar manner in the region of filling-region section 28b. Just like the second optical fibre bundle 48b, the third optical fibre bundle 48c also includes a plurality of Fibre Bragg Grating sensors 50 which are arranged in planar distributed manner along filling-region section 28b. However, unlike the third optical fibre bundle 48c which is arranged directly in filling-region section 28b, the second optical fibre bundle 48b is separated from filling-region section 28a by the separating membrane 44. The semipermeable membrane 44 consequently constitutes a separating device which separates the second optical fibre bundle 48b from filling-region section 28a and consequently also from the material M from the material storage tank 20 to be supplied into filling-region section 28a. Lastly, fourth and fifth optical fibre bundles 48d, 48e extend through filling-region sections 28c, 28d. Fibre Bragg Grating sensors 50 which are arranged in distributed manner along filling-region sections 28c, 28d are also integrated into the fourth and fifth optical fibre bundles 48d, 48e.

Finally, the apparatus 10 includes a second heating appliance 52 which in operation of the apparatus 10 serves to heat up the moulding tool 24 to a desired temperature. In the course of producing the sandwich component 12 illustrated in FIG. 3, with a core 14 consisting of a polymethacrylimide foam and with superficial top layers 16, 18 consisting of carbon-fibre-reinforced plastic, the moulding tool 24 may be heated to a temperature of about 120° C. in the course of the supply of material M from the material storage tank 20 into the moulding tool 24. When the filling region 28 of the moulding tool 24 is completely filled with material M from the material storage tank 20, the second heating appliance 52 can of course also be utilised for heating up the moulding tool 24 to a temperature that enables a curing of the material M introduced into the filling region 28 of the moulding tool 24. For example, a curing temperature of 180° C. is possible. The second heating appliance 52 may be designed in the form of an oven surrounding the moulding tool 24.

In operation of the apparatus 10, by means of the conveying device 42 an underpressure is generated in the filling region 28 of the moulding tool 24. As a result, material M is sucked out of the material storage tank 20 into the filling region 28 of the moulding tool 24, and the reinforcing fibres 30 arranged in the filling region 28 are impregnated with the material from the material storage tank 20. The flow of material through the material supply line 28 and the individual sections 28a, 28b, 28c, 28d of the filling region 28, i.e. the movement of a flow front F of the material M through the material supply line 38 and the sections 28a, 28b, 28c, 29d of the filling region 28, is monitored by means of the Fibre Bragg Grating sensors 50 integrated into the optical fibre bundles 48a, 48b, 48c, 48d, 48e (see FIG. 2). In particular, the Fibre Bragg Grating sensors 50 enable a virtually continuous monitoring of the progress of the flow front F of the material M from the material storage tank 20 through the material supply line 38 and the individual sections 28a, 28b, 28c, 28d of the filling region 28 formed in the moulding tool 24.

In particular, an evaluating unit 54, which includes a lightsource, not illustrated in any detail in the Figures, for coupling light into the optical fibre bundles 48a, 48b, 48c, 48d, 48e and also a spectrometer, likewise not shown, for detecting the wavelength $\lambda_B$ of the light reflected from the Bragg Grating structure of the Fibre Bragg Grating sensors 50, ascertains from the wavelengths $\lambda_B$ of the light reflected from the Bragg Grating structures of the Fibre Bragg Grating sensors 50 the change of temperature in the environment of the respective Fibre Bragg Grating sensors 50. The movement of the flow front F of the material M exhibiting a temperature of about 80° C. out of the material storage tank 20 through the material supply line 38 and the filling region 28 of the moulding tool 24 which is heated up to a temperature of about 120° C. can consequently be detected and retraced by the Fibre Bragg Grating sensors 50 distributed in planar manner along the material supply line 38 and along filling-region sections 28a, 28b, 28c, 28d consequently virtually continuously and almost in surface-covering manner in real time. By reason of the small physical volume of the optical fibre bundles 48a, 48b, 48c, 48d, 48e, the flow of material through the material supply line 38 or through the filling region 28 of the moulding tool 24 is not impaired significantly, even when the optical fibre bundles 48a, 48b, 48c, 48d, 48e are directly integrated into the material supply line 38 or into the filling region 28 of the moulding tool.

The signals output by the Fibre Bragg Grating sensors 50 or by the evaluating unit 54 are supplied to a control unit 56. The control unit 56 is realised in the form of an electrical control unit. In dependence on the signals supplied to it by the Fibre Bragg Grating sensors 50 or by the evaluating unit 54, the control unit 56 controls the operation of the first heating appliance 22 for heating the material storage tank 20, the operation of the second heating appliance 52 for heating the moulding tool 24, and also the conveying device 42 for conveying the material M out of the material storage tank 20 into the filling region 28 of the moulding tool 24. In other words, the control unit 56 is capable of influencing the movement of the flow front F of the material M out of the material storage tank 20 through the material supply line 38 and the filling region 28 of the moulding tool 24 in dependence on the signals output by the Fibre Bragg Grating sensors 50 or the evaluating unit 54. For this purpose the control unit 56 may, for example, compare the rate of motion of the flow front F of the material M out of the material storage tank 20 through the material supply line 38 and the filling region 28 of the moulding tool 24 with corresponding set values saved in a memory of the control unit 56.

After completion of the supply of material from the material storage tank 20 into the filling region 28 of the moulding tool 24, the third optical fibre bundle 48c arranged directly in filling-region section 28b remains in the moulding tool 24 also during the following curing step. This also applies to the fourth and fifth optical fibre bundles 48d, 48e. The sandwich component 12 illustrated in FIG. 3 consequently includes a superficial top layer 18 and also reinforcing regions 17, 19, into each of which an optical fibre bundle 48c, 48d, 48e with corresponding Fibre Bragg Grating sensors 50 is integrated, respectively. The second optical fibre bundle 48b employed for monitoring filling-region section 28a, on the other hand, is removed from the moulding tool 24 prior to the curing of the material introduced into filling-region section 28a and can be used in the course of producing a further component. By virtue of the arrangement of the second optical fibre bundle 48b between the semipermeable membrane 44 and the film 46, i.e. outside filling-region section 28a, a contamination of a second optical fibre bundle 48a by the material M introduced into filling-region section 28b is prevented.

The optical fibre bundles 48c, 48d, 48e, with the corresponding Fibre Bragg Grating sensors 50, integrated into the sandwich component 12 can be used for the purpose of monitoring the structural integrity of the sandwich component 12. In particular, the detection of a variation in a wavelength $\lambda_B$ of the light reflected from the Bragg Grating structure of the Fibre Bragg Grating sensors 50 enables conclusions as regards a deformation of the optical fibre bundles 48b, 48d, 48e in the longitudinal direction of the fibre bundles 48b, 48d, 48e caused by a mechanical stressing of the component 12.

The invention claimed is:
1. Apparatus for producing a component, comprising:
a material storage tank for receiving a liquid material,
a moulding tool in which a filling region to be filled with material from the material storage tank is formed, a material supply line which connects the material storage tank to the filling region of the moulding tool, and at least one optical fibre arranged in the region of the material supply line and/or the filling region of the moulding tool, into which at least one Fibre Bragg Grating sensor for detecting a parameter that is characteristic of the flow of material through the material supply line and/or the filling region of the moulding tool is integrated.

2. Apparatus according to claim 1, further comprising a control unit that is adapted to control the flow of material through the material supply line and/or the filling region of the moulding tool in dependence on the signals output by the Fibre Bragg Grating sensor.

3. Apparatus according to claim 1, wherein an optical fibre extends along at least one section of the material supply line, wherein in particular a plurality of Fibre Bragg Grating sensors for detecting a parameter that is characteristic of the flow of material through the material supply line are integrated into the optical fibre which are arranged in distributed manner along the section of the material supply line, and/or in that an optical fibre extends along at least one section of the filling region of the moulding tool, wherein in particular a plurality of Fibre Bragg Grating sensors for detecting a parameter that is characteristic of the flow of material through the filling region are integrated into the optical fibre which are arranged in distributed manner along the section of the filling region.

4. Apparatus according to claim 1, wherein an optical fibre arranged in the region of the filling region of the moulding tool is separated from the filling region by a separating device and/or is arranged directly in the filling region.

5. Apparatus according to claim 1, wherein a receiving region for receiving a core of the component realised in a sandwich construction is formed in the moulding tool, the filling region of the moulding tool extending along a surface of the receiving region and/or through the receiving region.

6. Method for producing a component, comprising:
supplying material from a material storage tank into a filling region of a moulding tool to be filled with the material from the material storage tank via a material supply line,
detecting a parameter that is characteristic of the flow of material through the material supply line and/or the filling region of the moulding tool by means of a Fibre Bragg Grating sensor which is integrated into an optical fibre arranged in the region of the material supply line and/or the filling region of the moulding tool.

7. Method according to claim 6, wherein the flow of material through the material supply line and/or the filling region of the moulding tool is controlled by a control unit in dependence on the signals output by the Fibre Bragg Grating sensor.

8. Method according to claim 6, wherein a parameter that is characteristic of the flow of material through the material supply line is detected by means of a plurality of Fibre Bragg Grating sensors which are integrated into an optical fibre extending along at least one section of the material supply line and in particular are arranged in distributed manner along the section of the material supply line, and/or in that a parameter that is characteristic of the flow of material through the filling region of the moulding tool is detected by means of a plurality of Fibre Bragg Grating sensors which are integrated into an optical fibre extending along at least one section of the filling region and in particular are arranged in distributed manner along the section of the filling region.

9. Method according to claim 6, wherein an optical fibre arranged in the region of the filling region of the moulding tool is separated from the filling region by a separating device and/or is arranged directly in the filling region.

10. Method according to claim 6, wherein an optical fibre arranged in the region of the filling region of the moulding tool is removed from the moulding tool after completion of the supply of material from the material storage tank into the filling region before the material supplied into the filling region is cured.

11. Method according to claim 6, wherein an optical fibre arranged directly in the filling region of the moulding tool remains in the moulding tool after completion of the supply of material from the material storage tank into the filling region while the material supplied into the filling region is being cured.

12. Method according to claim 6, wherein a core of the component realised in a sandwich construction is introduced into a receiving region formed in the moulding tool, and material from the material storage tank is supplied into a filling region of the moulding tool which extends along a surface of the receiving region and/or through the receiving region.

13. Method according to claim 6, wherein at least one Fibre Bragg Grating sensor for detecting a parameter that is characteristic of the structural integrity of the aircraft structure component is integrated into at least one optical fibre.

14. Method according to claim 13, wherein an optical fibre is integrated into a section of the aircraft structure component consisting of a fibre-reinforced composite material.

15. Apparatus according to claim 1, further comprising at least one optical fibre into which at least one Fibre Bragg Grating sensor for detecting a parameter that is characteristic of the structural integrity of the aircraft structure component is integrated.

* * * * *